(12) United States Patent
Hosotani

(10) Patent No.: US 12,027,878 B2
(45) Date of Patent: Jul. 2, 2024

(54) WIRELESS POWER TRANSMISSION APPARATUS AND WIRELESS POWER SUPPLY SYSTEM

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 18 days.

(21) Appl. No.: 18/067,553

(22) Filed: Dec. 16, 2022

(65) Prior Publication Data

US 2023/0147880 A1    May 11, 2023

Related U.S. Application Data

(63) Continuation of application No. PCT/JP2021/006439, filed on Feb. 19, 2021.

(30) Foreign Application Priority Data

Jul. 6, 2020 (JP) ................................ 2020-116426

(51) Int. Cl.
*H02J 50/12* (2016.01)
*H02M 1/00* (2007.01)

(52) U.S. Cl.
CPC ........... *H02J 50/12* (2016.02); *H02M 1/0009* (2021.05)

(58) Field of Classification Search
CPC ......... H02J 50/12; H02M 1/0009; H02M 1/00
See application file for complete search history.

(56) References Cited

FOREIGN PATENT DOCUMENTS

| JP | 2009-101884 A | 5/2009 |
|----|---------------|--------|
| JP | 2013-215065 A | 10/2013 |
| JP | 2013-252001 A | 12/2013 |
| JP | 2014-110733 A | 6/2014 |
| JP | 2017-135880 A | 8/2017 |
| JP | 6338808 B1    | 6/2018 |
| WO | 2011/010375 A1 | 1/2011 |
| WO | 2015/128942 A1 | 9/2015 |
| WO | 2019/021655 A1 | 1/2019 |

OTHER PUBLICATIONS

International Search Report issued in PCT/JP2021/006439; dated May 25, 2021.

*Primary Examiner* — Robert L Deberadinis
(74) *Attorney, Agent, or Firm* — Studebaker & Brackett PC

(57) ABSTRACT

A wireless power transmission apparatus includes a power transmission resonance mechanism including a wireless power transmission coil and a power transmission resonance capacitor; a power transmission circuit that performs switching of the power transmission resonance mechanism at a predetermined switching frequency; a voltage conversion circuit that performs voltage conversion on an input power supply voltage; an intermediate capacitor between the voltage conversion circuit and the power transmission circuit and shared between the voltage conversion circuit and the power transmission circuit; an intermediate input current detection circuit that detects an intermediate input current input to the power transmission circuit from the voltage conversion circuit; and an electric power management circuit that, by setting an upper limit value for the intermediate input current and controlling an output voltage of the voltage conversion circuit, adjusts the amplitude of a DC voltage or current intermittently provided to the power transmission resonance mechanism.

20 Claims, 9 Drawing Sheets

WIRELESS POWER TRANSMISSION APPARATUS AND WIRELESS POWER SUPPLY SYSTEM

CROSS-REFERENCE TO RELATED APPLICATIONS

This application claims benefit of priority to International Patent Application No. PCT/JP2021/006439, filed Feb. 19, 2021, and to Japanese Patent Application No. 2020-116426, filed Jul. 6, 2020, the entire contents of each are incorporated herein by reference.

BACKGROUND

Technical Field

The present disclosure relates to a wireless power transmission apparatus that wirelessly transmits electric power and to a wireless power supply system that includes the wireless power transmission apparatus and a wireless power reception apparatus that wirelessly receives electric power.

Background Art

In Japanese Unexamined Patent Application Publication No. 2013-215065, a power transfer system that includes a power transmission apparatus including an AC converter that performs AC conversion of supplied AC power or DC power, a power-transmission-side resonance coil that wirelessly transmits AC power, and a power-transmission-side control device; and a power reception apparatus including a power-reception-side resonance coil, a rectifier, a DC converter, and a power-reception-side control device, is described. The power transfer system is described in which, after the power-reception-side control device is activated by receiving a control power supply voltage, the power-reception-side control device measures an output voltage of the rectifier and transmits the measured output voltage to the power-transmission-side control device, and the power-transmission-side control device controls, based on a measurement result of the output voltage of the rectifier, the AC converter in such a manner that the output voltage of the rectifier has an appropriate value as an input voltage of the DC converter.

In general, in a wireless power supply system, in order to adjust received power with respect to changes in a transfer distance and a power consumption at a load as a destination to which received power is supplied, control of electric power to be transmitted is required. In particular, in a system or an application handling high power, power management with a high-precision control function for power to be transmitted is required, in terms of temperature management with regard to heat generation caused by power loss and security in a circuit device.

Meanwhile, in the power reception apparatus, received power varies according to changes in the arrangement of the power transmission apparatus and the power reception apparatus and a transfer distance, and the power consumption at the load also varies. In the power transmission apparatus, to finely adjust electric power to be supplied to the power reception apparatus, being able to continuously adjust the strength of a high-frequency alternating magnetic field generated by a power transmission coil is required. However, continuously adjusting a high-frequency alternating magnetic field with excellent power efficiency is technically difficult.

In the power transmission apparatus, it is not easy to understand received power on the basis of voltage, current, and electric power in a circuit operation, and the received power and the strength of the high-frequency alternating magnetic field are not always correlated with each other. Thus, even if the strength of the high-frequency alternating magnetic field is continuously adjusted so that received power can be adjusted, voltage, current, or electric power of a circuit (power transmission circuit) inside the power transmission apparatus may become too high.

For example, even with the same strength of an alternating magnetic field generated by the power transmission coil, electromagnetic field energy generated by the power transmission coil is not always supplied efficiently. It is not easy to distinguish, with a simple configuration, between the case where the electromagnetic field energy is supplied efficiently and the case where the electromagnetic field energy is not supplied efficiently. There is no problem in the case where electric power of electromagnetic field energy generated by the power transmission coil is consumed in the power reception apparatus. However, if current flows only to a circuit in the power transmission apparatus without the electromagnetic field energy being supplied to the power reception apparatus, large power loss occurs in the power transmission circuit. As a result, voltage, current, and electric power in the power transmission circuit become too high, and this causes a problem of electrical stress and heat generation in the circuit.

SUMMARY

If only the strength of a high-frequency alternating magnetic field in the power transmission circuit is adjusted without detecting the efficiency with which electromagnetic field energy generated by the power transmission coil is supplied to the power reception apparatus, the voltage, current, electric power, and the like of the power transmission circuit become too high. Thus, the circuit may be destroyed or the reliability of circuit components may be significantly degraded. In contrast, if the voltage, current, and electric power of the power transmission circuit are controlled so that the circuit cannot be destroyed, the strength of the alternating magnetic field cannot be adjusted efficiently, and an excellent power supply efficiency cannot be achieved.

Thus, the present disclosure provides a wireless power transmission apparatus and a wireless power supply system with high security that are capable of continuously adjusting an alternating magnetic field with a simple circuit configuration and not causing excessive electrical stress or heat generation in a power transmission circuit without depending on changes in arrangement of and distance between the power transmission apparatus and a power reception apparatus.

A wireless power transmission apparatus according to an example of the present disclosure includes a power transmission resonance mechanism that includes a power transmission coil and a power transmission resonance capacitor; a power transmission circuit that performs switching in such a manner that a DC voltage or a DC current is intermittently provided to the power transmission resonance mechanism at a predetermined switching frequency; a voltage conversion circuit that performs voltage conversion on an input power supply; and an intermediate capacitor that is provided between the voltage conversion circuit and the power transmission circuit and shared between the voltage conversion circuit and the power transmission circuit. The wireless power transmission apparatus further includes an intermediate input current detection circuit that detects an intermediate input current input to the power transmission circuit from the voltage conversion circuit; and an electric power management circuit that, by setting an upper limit value for the intermediate input current and controlling an intermediate voltage, which is a voltage of the intermediate capacitor serving as an output voltage of the voltage conversion circuit, adjusts an amplitude of the DC voltage or the DC current intermittently provided to the power transmission resonance mechanism. The electric power management circuit controls strength of an alternating magnetic field at the switching frequency generated by the power transmission coil.

A wireless power supply system according to an example of the present disclosure includes a wireless power reception apparatus and a wireless power transmission apparatus. The wireless power reception apparatus includes a power reception coil.

The wireless power transmission apparatus includes a power transmission resonance mechanism that includes a power transmission coil magnetically coupled to the power reception coil, and a power transmission resonance capacitor, a power transmission circuit that performs switching in such a manner that a DC voltage or a DC current is intermittently provided to the power transmission resonance mechanism at a predetermined switching frequency, a voltage conversion circuit that performs voltage conversion on an input power supply, and an intermediate capacitor that is provided between the voltage conversion circuit and the power transmission circuit and shared between the voltage conversion circuit and the power transmission circuit. The wireless power transmission apparatus further includes an intermediate input current detection circuit that detects an intermediate input current input to the power transmission circuit from the voltage conversion circuit, and an electric power management circuit that, by setting an upper limit value for the intermediate input current and controlling an intermediate voltage, which is a voltage of the intermediate capacitor serving as an output voltage of the voltage conversion circuit, adjusts an amplitude of the DC voltage or the DC current intermittently provided to the power transmission resonance mechanism. The electric power management circuit controls strength of an alternating magnetic field at the switching frequency generated by the power transmission coil.

According to the present disclosure, a wireless power transmission apparatus and a wireless power supply system with high security that are capable of continuously adjusting an alternating magnetic field with a simple circuit configuration and not causing excessive electrical stress or heat generation in a wireless power transmission circuit without depending on changes in arrangement of and distance between the wireless power transmission apparatus and a wireless power reception apparatus, can be obtained.

DETAILED DESCRIPTION

First Embodiment

Figure 1:
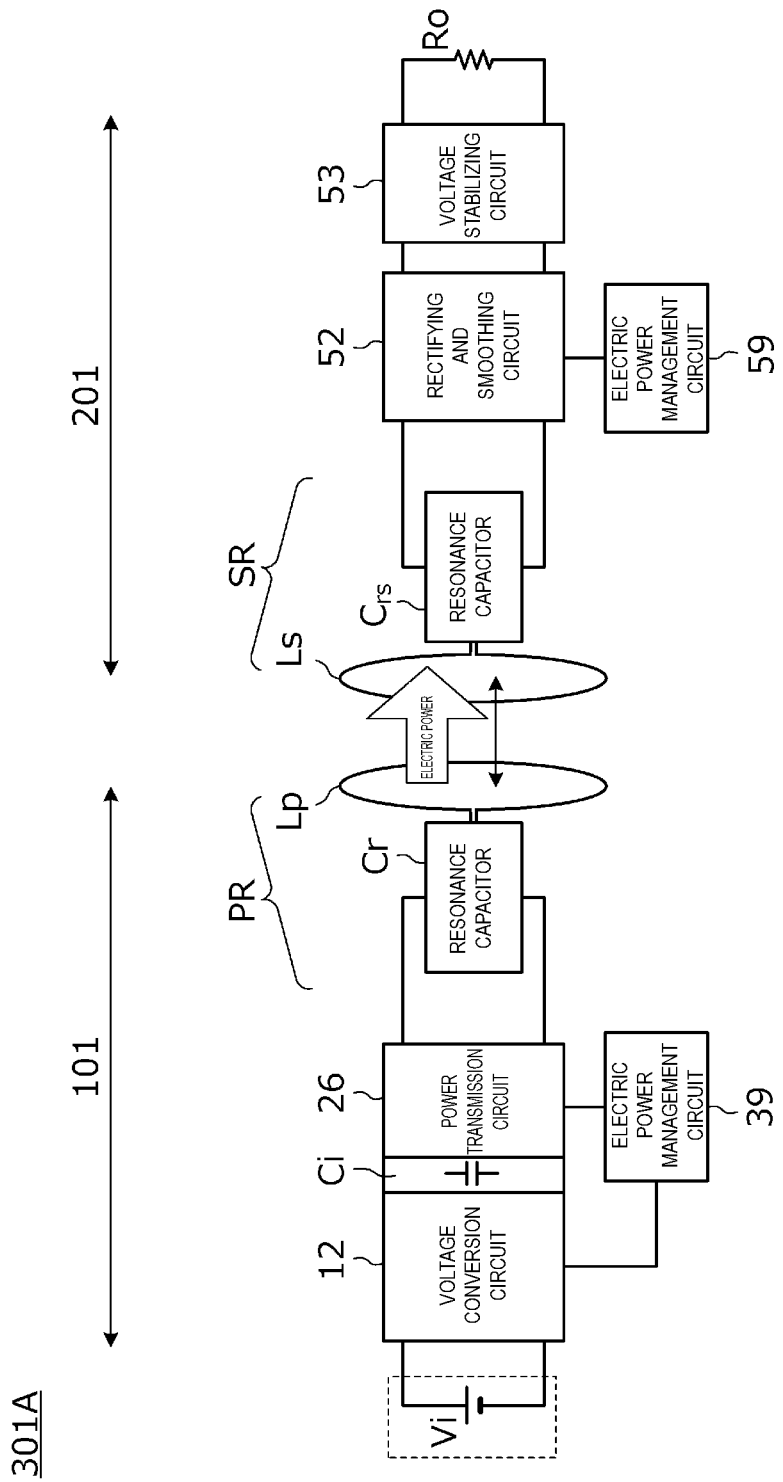
FIG. 1 is a block diagram illustrating a configuration of a wireless power supply system according to a first embodiment.

FIG. 1 is a block diagram illustrating a configuration of a wireless power supply system 301A according to a first embodiment of the present disclosure. The wireless power supply system 301A includes a wireless power transmission apparatus 101, and a wireless power reception apparatus 201 including a wireless power reception coil Ls that is wirelessly and magnetically coupled to a wireless power transmission coil Lp provided in the wireless power transmission apparatus 101.

The wireless power transmission apparatus 101 includes a power transmission resonance mechanism PR, a power transmission circuit 26, a voltage conversion circuit 12, an intermediate capacitor Ci, an intermediate input current detection circuit, and an electric power management circuit 39.

The wireless power transmission coil Lp and a power transmission resonance capacitor Cr configure a resonance circuit. The power transmission resonance mechanism PR includes the wireless power transmission coil Lp and the power transmission resonance capacitor Cr.

The power transmission circuit 26 includes a switching circuit. The power transmission circuit 26 performs switching in such a manner that a DC voltage or a DC current is intermittently provided to the power transmission resonance mechanism PR at a predetermined switching frequency.

An input power supply Vi is connected to an input part of the voltage conversion circuit 12. The voltage conversion circuit 12 converts the voltage of the input power supply Vi into a predetermined voltage and inputs the converted voltage to the power transmission circuit 26.

The intermediate capacitor Ci is provided between the voltage conversion circuit 12 and the power transmission circuit 26 and is shared between the voltage conversion circuit 12 and the power transmission circuit 26. Thus, the number of components can be reduced. Furthermore, current flowing into the intermediate capacitor Ci and current flowing out of the intermediate capacitor Ci are canceled out, and noise can thus be reduced.

The electric power management circuit 39 includes the above-mentioned intermediate input current detection circuit. The intermediate input current detection circuit detects an intermediate input current input to the power transmission circuit 26 from the voltage conversion circuit 12.

By setting an upper limit value for the intermediate input current and controlling the output voltage of the voltage conversion circuit 12, the electric power management circuit 39 adjusts the amplitude of a DC voltage or current intermittently provided to the power transmission resonance mechanism PR. The electric power management circuit 39 controls the voltage conversion circuit 12 in such a manner that, when the intermediate input current reaches the upper limit, the intermediate voltage serving as the output voltage of the voltage conversion circuit 12 decreases.

The wireless power reception apparatus 201 includes a power reception resonance mechanism SR, a rectifying and smoothing circuit 52, a voltage stabilizing circuit 53, and an electric power management circuit 59.

A load Ro is connected to an output part of the voltage stabilizing circuit 53.

The wireless power reception coil Ls and a power reception resonance capacitor Crs configure a resonance circuit. The power reception resonance mechanism SR includes the wireless power reception coil Ls and the power reception resonance capacitor Crs.

The rectifying and smoothing circuit 52 rectifies and smooths the output voltage of the power reception resonance mechanism SR. The voltage stabilizing circuit 53 stabilizes the output voltage of the rectifying and smoothing circuit 52 and outputs the stabilized output voltage to the load Ro.

The electric power management circuit 59 controls the rectifying and smoothing circuit 52 and includes received power request means for transmitting a received power request signal to the wireless power transmission apparatus 101 under resonance modulation control.

The electric power management circuit 39 on the wireless power transmission apparatus 101 side includes received power request signal receiving means for receiving the above-mentioned received power request signal under demodulation control for detecting the received power request signal. The electric power management circuit 39 controls the voltage conversion circuit 12 in accordance with the received power request signal.

A feedback system includes transmission of a received power request signal to the wireless power transmission apparatus 101 and adjustment of power to be transmitted according to the received power request signal. Thus, the wireless power reception apparatus 201 receives necessary electric power and supplies the received power to the load Ro.

Operation of the above-described wireless power supply system 301A will be described below. When the strength of an alternating magnetic field generated by the wireless power transmission coil Lp increases, an intermediate input current flowing from the intermediate capacitor Ci to a subsequent stage increases. The electric power management circuit 39 detects the increase of the current, and reduces the output voltage of the voltage conversion circuit 12. As a result, an intermediate voltage, which is the voltage of the intermediate capacitor Ci serving as the output voltage of the voltage conversion circuit 12, decreases.

When the intermediate voltage decreases, a DC voltage or a DC current intermittently provided to the power transmission resonance mechanism PR, which includes the wireless power transmission coil Lp and the power transmission resonance capacitor Cr, decreases, and the amplitude voltage of a square wave decreases. Thus, a resonance current flowing to the wireless power transmission coil Lp decreases, and the strength of an alternating magnetic field decreases. The strength of the alternating magnetic field is feedback-controlled, as described above.

As described above, the intermediate input current detection circuit inside the electric power management circuit 39 detects the intermediate input current input to the power transmission circuit 26 from the voltage conversion circuit 12, and the electric power management circuit 39 sets an upper limit value for the intermediate input current, so that the output voltage of the voltage conversion circuit 12 (voltage of the intermediate capacitor Ci) is controlled in such a manner that the intermediate input current does not exceed the upper limit value. By controlling the output voltage of the voltage conversion circuit 12, the amplitude of the DC voltage or current intermittently provided to the power transmission resonance mechanism PR is adjusted.

In the case where the voltage of the intermediate capacitor Ci (intermediate input voltage) is constant, the intermediate input current is proportional to electric power handled by the power transmission circuit 26 and is substantially proportional to electric power supplied to the wireless power reception apparatus 201 from the wireless power transmission coil Lp. Thus, even if electromagnetic field energy generated by the wireless power transmission coil Lp is not always efficiently supplied to the wireless power reception apparatus 201, electric power to be received by the wireless power reception apparatus 201 can be controlled to be equal to an electric power required by the wireless power reception apparatus 201.

A state in which current flows only to a circuit inside the wireless power transmission apparatus 101 without electromagnetic field energy generated by the wireless power transmission coil Lp being supplied to the wireless power reception apparatus 201 represents a state in which reactive power (imaginary power when electric power is expressed by a complex number) is large. Meanwhile, active power (real power when electric power is expressed by a complex number), that is, power consumption, is determined by the product of "intermediate input voltage" and "intermediate input current". In the case where electromagnetic field energy generated by the wireless power transmission coil Lp is supplied to the wireless power reception apparatus 201, that is, only in the case where electric power is consumed at the wireless power reception apparatus 201, the "intermediate input current" increases.

Next, another wireless power supply system according to the first embodiment will be described as an example.

Figure 2:
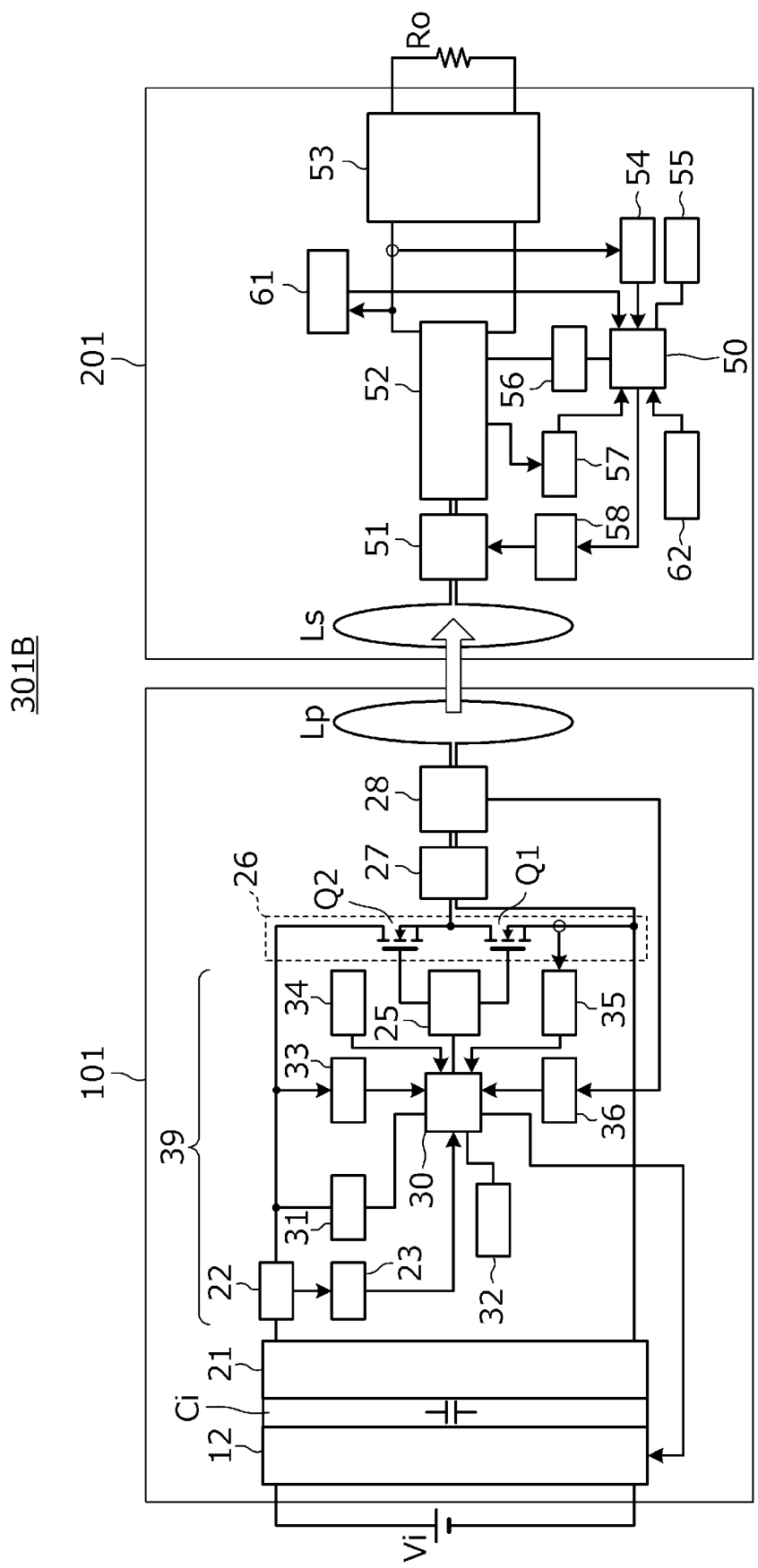
FIG. 2 is a circuit diagram of a wireless power supply system with a configuration different from that of the wireless power supply system illustrated in FIG. 1.

FIG. 2 is a circuit diagram of a wireless power supply system 301B with a configuration different from that of the wireless power supply system 301A illustrated in FIG. 1.

The voltage conversion circuit 12 of the wireless power transmission apparatus 101 converts a DC input power supply voltage into a predetermined voltage. An MPU 30 is a digital control circuit that controls units of the wireless power transmission apparatus 101. An input filter 21 removes a ripple component and a noise component. The intermediate capacitor Ci is provided between the voltage conversion circuit 12 and the input filter 21. A current detection circuit 22 detects an intermediate input current, which is a current input in an inward direction from the voltage conversion circuit 12. The current detection circuit 22 detects current flowing in a line so that a signal transmitted from the wireless power reception apparatus 201 can be detected. A demodulation circuit 23 demodulates a signal on the basis of a change in the current detected by the current detection circuit 22 and inputs the demodulated signal to the MPU 30. A driver 25 performs switching of switching elements Q1 and Q2 in accordance with a control signal from the MPU 30.

The power transmission circuit 26 includes the first switching element Q1, which is on a high side, and the second switching element Q2, which is on a low side, and turns on and off the switching elements Q1 and Q2 in accordance with a gate signal from the driver 25. An EMI filter 27 reduces a noise component causing electromagnetic interference. A resonance adjusting circuit 28 includes a power transmission resonance capacitor. The resonance adjusting circuit 28 forms, together with the wireless power transmission coil Lp, a resonance circuit and adjusts the resonant frequency of the resonance circuit.

A voltage regulator circuit 31 stabilizes the power supply voltage with respect to the MPU 30. An oscillator 32 provides a clock signal to the MPU 30.

An overvoltage protection circuit 33 detects whether or not a voltage supplied to the power transmission circuit 26 is an overvoltage and inputs a result of the detection to the MPU 30. A temperature detection circuit 34 detects whether or not temperatures of the switching elements Q1 and Q2 are in an overheated state and inputs a result of the detection to the MPU 30. An overcurrent detection circuit 35 detects whether or not a current flowing to the power transmission circuit 26 is an overcurrent and inputs a result of the detection to the MPU 30. An overpower detection circuit 36 detects, based on a voltage generated at the resonance adjusting circuit 28, whether or not power to be transmitted is an overpower and inputs a result of the detection to the MPU 30.

By providing a control signal to the voltage conversion circuit 12, the MPU 30 adjusts the output voltage of the voltage conversion circuit 12. Thus, protection against overpower supply can be achieved. Circuits between the input filter 21 and the power transmission circuit 26 configure the electric power management circuit 39.

An MPU 50 inside the wireless power reception apparatus 201 controls units of the wireless power reception apparatus 201. A power reception resonance adjusting circuit 51 includes a power reception resonance capacitor. The power reception resonance adjusting circuit 51 forms, together with the wireless power reception coil Ls, a resonance circuit and adjusts the resonant frequency of the resonance circuit. A rectifying and smoothing circuit 52 rectifies and smooths a voltage generated in the power reception resonance circuit, which includes the wireless power reception coil Ls and the power reception resonance adjusting circuit 51, and inputs the rectified and smoothed voltage to the voltage stabilizing circuit 53. A voltage stabilizing circuit converts the output voltage of the rectifying and smoothing circuit 52 into a specified voltage and supplies the converted voltage to the load Ro.

An overpower protection circuit 54 detects, based on a current flowing in the voltage stabilizing circuit 53, whether or not electric power supplied to the load is an overpower, and inputs a result of the detection to the MPU 50. An oscillator 55 provides a clock signal to the MPU 50. A voltage regulator circuit 56 stabilizes a power supply voltage with respect to the MPU 50. An overvoltage protection circuit 57 detects whether or not the output voltage of the rectifying and smoothing circuit 52 is an overvoltage and inputs a result of the detection to the MPU 50. A modulation circuit 58 modulates the power reception resonance adjusting circuit 51. By causing the modulation circuit 58 to modulate the power reception resonance adjusting circuit 51, the MPU 50 transmits a predetermined signal to the wireless power transmission apparatus 101.

A power reception voltage detection circuit 61 detects the output voltage of the rectifying and smoothing circuit 52 and inputs the detected output voltage to the MPU 50. A temperature detection circuit 62 detects the temperature of the wireless power reception apparatus 201 and inputs the detected temperature to the MPU 50.

By causing the modulation circuit 58 to modulate the power reception resonance adjusting circuit 51, the wireless power reception apparatus 201 transmits a received power request signal to the wireless power transmission apparatus 101. Furthermore, the wireless power transmission apparatus 101 detects a received power request signal under the demodulation control of the demodulation circuit 23.

Operation of the above-described wireless power supply system 301B will be described below. When the strength of an alternating magnetic field generated by the wireless power transmission coil Lp increases, the intermediate input current flowing from the intermediate capacitor Ci to a subsequent stage increases. When detecting the increase in the intermediate input current, the MPU 50 adjusts a detection value of the output voltage of the voltage conversion circuit 12 so that a potential returned to an output voltage feedback terminal is apparently increased. As a result, the width of pulses for driving a switching element in the voltage conversion circuit 12 is finely adjusted, and the voltage of the intermediate capacitor Ci (intermediate voltage) decreases.

When the intermediate voltage decreases, the DC voltage intermittently provided to the power transmission resonance mechanism PR, which includes the wireless power transmission coil Lp and the power transmission resonance capacitor Cr, decreases, and the amplitude voltage of a square wave decreases. Thus, the resonance current flowing in the wireless power transmission coil Lp decreases, and the strength of an alternating magnetic field decreases. The strength of the alternating magnetic field is feedback-controlled, as described above.

Furthermore, the MPU 30 controls the voltage conversion circuit 12 to reduce the intermediate voltage serving as the output voltage of the voltage conversion circuit 12 in such a manner that the temperature of the voltage conversion circuit 12 or the power transmission circuit 26 detected by the temperature detection circuit 34 does not exceed a predetermined upper limit value.

Furthermore, the MPU 30 detects, based on output of the overcurrent detection circuit 35 or the overpower detection circuit 36, an abnormality of the voltage conversion circuit 12 or the power transmission circuit 26. In the case where an abnormality of the voltage conversion circuit 12 or the power transmission circuit 26 is detected, the MPU 30 reduces the intermediate voltage serving as the output voltage of the voltage conversion circuit 12 to a value less or than equal to a predetermined value, and then stops switching of the power transmission circuit 26.

As described above, the current detection circuit 22 detects the intermediate input current input to the power transmission circuit 26 from the voltage conversion circuit 12, and the MPU 30 sets the upper limit value for the intermediate input current. Thus, the output voltage of the voltage conversion circuit 12 (voltage of the intermediate capacitor Ci) is controlled in such a manner that the intermediate input current does not exceed the upper limit value. By controlling the output voltage of the voltage conversion circuit 12, the amplitude of the DC voltage or current intermittently provided to the power transmission resonance mechanism PR is adjusted.

In the case where the voltage of the intermediate capacitor Ci is constant, the intermediate input current is proportional to electric power handled by a power transmission circuit and is substantially proportional to electric power supplied to the wireless power reception apparatus 201 from the wireless power transmission coil Lp. Thus, even if electromagnetic field energy generated by the wireless power transmission coil Lp is not always efficiently supplied to the wireless power reception apparatus 201, electric power to be received by the wireless power reception apparatus 201 can be controlled to be equal to an electric power required by the wireless power reception apparatus 201.

Furthermore, the voltage conversion circuit 12 is controlled in such a manner that the current flowing in the voltage conversion circuit 12 or the power transmission circuit 26 or the temperature of the voltage conversion circuit 12 or the power transmission circuit 26 does not exceed a predetermined upper limit value. Thus, an abnormality such as an overpower can be avoided.

Furthermore, in the case where an abnormality of the voltage conversion circuit 12 or the power transmission circuit 26 is detected, the intermediate voltage serving as the output voltage of the voltage conversion circuit 12 is reduced to be less than or equal to the predetermined value. Thus, the operation of the power transmission circuit 26 stops, and the strength of an alternating magnetic field at a switching frequency can be fully controlled without depending on whether or not a desired power transmission is successfully performed.

Second Embodiment

In a second embodiment, a wireless power supply system that specifically represents a voltage conversion circuit, an intermediate input current detection circuit, a rectifying and smoothing circuit, and so on will be described as an example.

Figure 3:
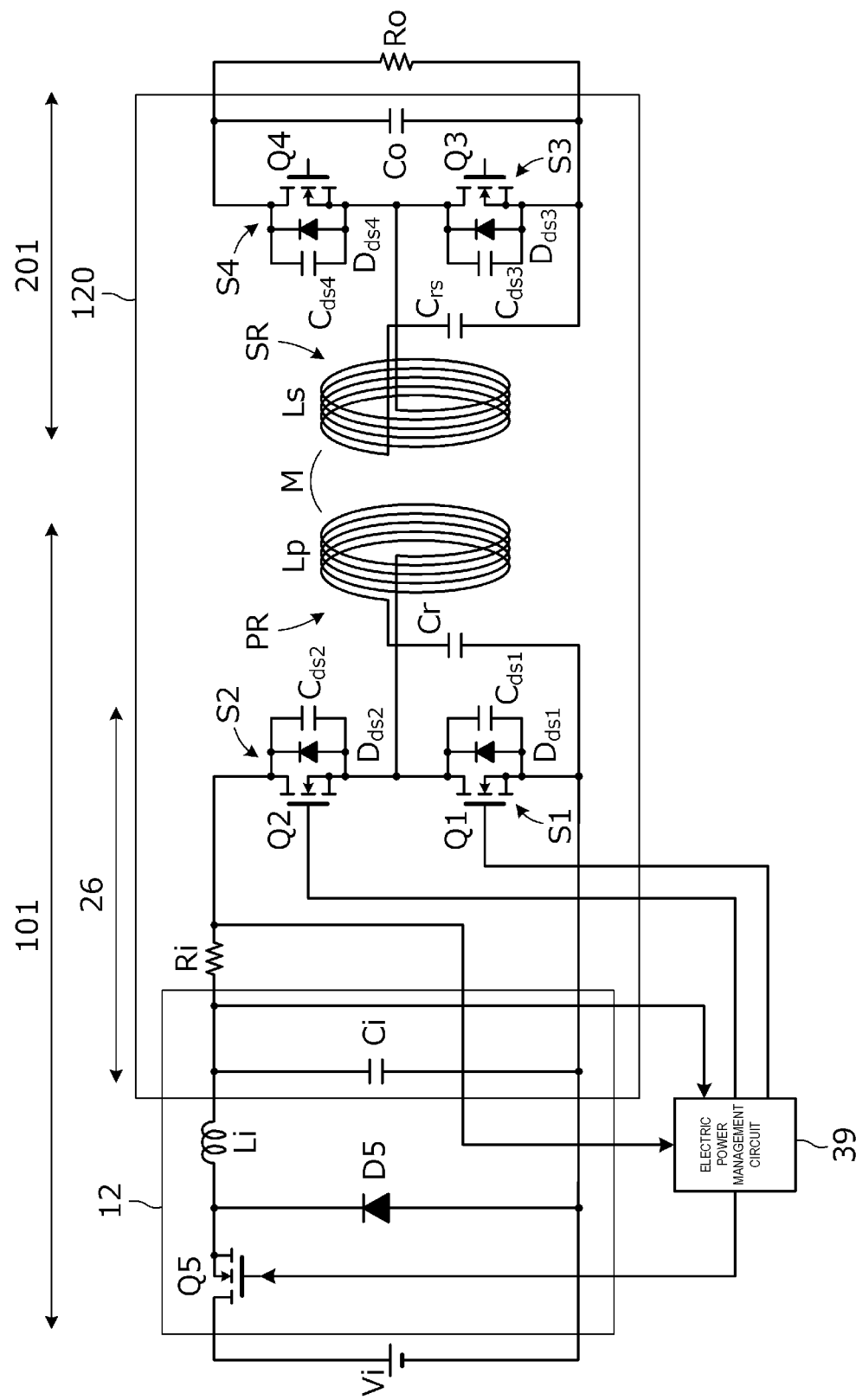
FIG. 3 is a circuit diagram illustrating a configuration of a wireless power supply system according to a second embodiment.

FIG. 3 is a circuit diagram illustrating a configuration of a wireless power supply system 302 according to the second embodiment. In this example, a circuit on a power transmission side performs a class-D converter operation, and a circuit on a power reception side performs a series resonance operation and a voltage-doubler rectifying operation.

The wireless power transmission apparatus 101 includes a first switch circuit S1 that equivalently includes a parallel connection circuit including the first switching element Q1, a diode Dds1, and a capacitor Cds1, a second switch circuit S2 that equivalently includes a parallel connection circuit including the second switching element Q2, a diode Dds2, and a capacitor Cds2, the wireless power transmission coil Lp, and the power transmission resonance capacitor Cr. The wireless power transmission coil Lp and the power transmission resonance capacitor Cr configure the power transmission resonance mechanism PR.

The wireless power transmission apparatus 101 further includes the voltage conversion circuit 12 including a switching element Q5, a diode D5, an inductor Li, and the intermediate capacitor Ci. By switching of the switching element Q5, the voltage conversion circuit 12 operates as a step-down converter.

The wireless power transmission apparatus 101 further includes a resistor element Ri and the electric power management circuit 39. The electric power management circuit 39 controls the switching elements Q1, Q2, and Q5. In this example, the electric power management circuit 39 controls the switching element Q5 of the voltage conversion circuit 12. Thus, the electric power management circuit 39 is part of the voltage conversion circuit 12. The electric power management circuit 39 performs switching of the switching element Q5, so that the voltage conversion circuit 12 is caused to operate as a step-down DC-DC converter. The electric power management circuit 39 also controls the switch-ON duty ratio of the switching element Q5 in such a manner that the output voltage of the voltage conversion circuit 12 is maintained at a predetermined voltage. That is, the electric power management circuit 39 detects the output voltage and performs negative feedback control of the output voltage.

The switching elements Q1 and Q2 are alternately turned on and off in accordance with a signal from the electric power management circuit 39.

The switching elements Q1 and Q2 are switching elements such as MOSFETs including a parasitic output capacitance or a parasitic diode. The switching elements Q1 and Q2 configure the switch circuits S1 and S2, respectively. The switch circuits S1 and S2 configure a power transmission circuit.

The electric power management circuit 39 performs switching of the first switching element Q1 and the second switching element Q2 at a predetermined operating frequency, so that the DC voltage is intermittently provided to the power transmission resonance mechanism PR and a resonance current is thus generated at the wireless power transmission coil Lp. Specifically, switching is performed at 13.56 MHz, which is used in NFC communication.

The wireless power reception apparatus 201 includes a third switch circuit S3 that equivalently includes a parallel connection circuit including the switching element Q3, a diode Dds3, and a capacitor Cds3, a fourth switch circuit S4 that equivalently includes a parallel connection circuit including the fourth switching element Q4, a diode Dds4, and a capacitor Cds4, the wireless power reception coil Ls, and the power reception resonance capacitor Crs. The wireless power reception coil Ls and the power reception resonance capacitor Crs configure the power reception resonance mechanism SR.

The wireless power reception apparatus 201 further includes a smoothing capacitor Co in a stage subsequent to the third switch circuit S3 and the fourth switch circuit S4. The smoothing capacitor Co, the third switch circuit S3, and the fourth switch circuit S4 configure a rectifying and smoothing circuit.

The third switch circuit S3 and the fourth switch circuit S4 rectify a voltage generated in the power reception resonance mechanism SR, which includes the wireless power reception coil Ls and the power reception resonance capacitor Crs, and the smoothing capacitor Co smooths the voltage. In this example, the wireless power reception coil Ls and the power reception resonance capacitor Crs configure a series resonance circuit. The wireless power transmission coil Lp and the wireless power reception coil Ls are magnetic-field coupled to each other. M in FIG. 3 indicates coupling between the wireless power transmission coil Lp and the wireless power reception coil Ls.

Circuits in stages subsequent to the intermediate capacitor Ci configure a wireless power supply unit 120. The intermediate capacitor Ci is part of the voltage conversion circuit 12 and is also part of the wireless power supply unit 120.

The electric power management circuit 39 inside the wireless power transmission apparatus 101 detects, based on a step-down voltage of the resistor element Ri, a current (intermediate input current) input to the power transmission circuit from the voltage conversion circuit 12, that is, a current supplied to the wireless power supply unit 120 from the voltage conversion circuit 12.

The electric power management circuit 39 sets an upper limit value for the intermediate input current, so that the output voltage of the voltage conversion circuit 12 (voltage of the intermediate capacitor Ci) is controlled in such a manner that the intermediate input current does not exceed the upper limit value. The output voltage of the voltage conversion circuit 12 is controlled, so that the amplitude of a DC voltage or current intermittently provided to the power transmission resonance mechanism PR is adjusted. As a result, electric power to be received by the wireless power reception apparatus 201 is controlled to be equal to an electric power required by the wireless power reception apparatus 201. Furthermore, electric power supplied to the power transmission circuit 26 is restricted, and breakdown of a circuit, an increase of electrical stress, and excessive heat generation are thus suppressed.

Furthermore, the electric power management circuit 39 may be configured to detect the voltage of the power transmission resonance capacitor Cr and control the voltage conversion circuit 12 to reduce the intermediate voltage in such a manner that the voltage of the power transmission resonance capacitor Cr does not exceed the upper limit value. Thus, the output voltage of the voltage conversion circuit 12 is controlled, and the amplitude of the DC voltage or current intermittently provided to the power transmission resonance mechanism PR is thus adjusted. As a result, electric power to be received by the wireless power reception apparatus 201 is controlled to be equal to an electric power required by the wireless power reception apparatus 201. Furthermore, electric power supplied to the power transmission circuit 26 is restricted, and breakdown of a circuit, an increase of electrical stress, and excessive heat generation are thus suppressed.

Third Embodiment

In a third embodiment, a wireless power supply system that specifically represents a voltage conversion circuit, an intermediate input current detection circuit, a rectifying and smoothing circuit, and so on will be described as an example.

Figure 4:
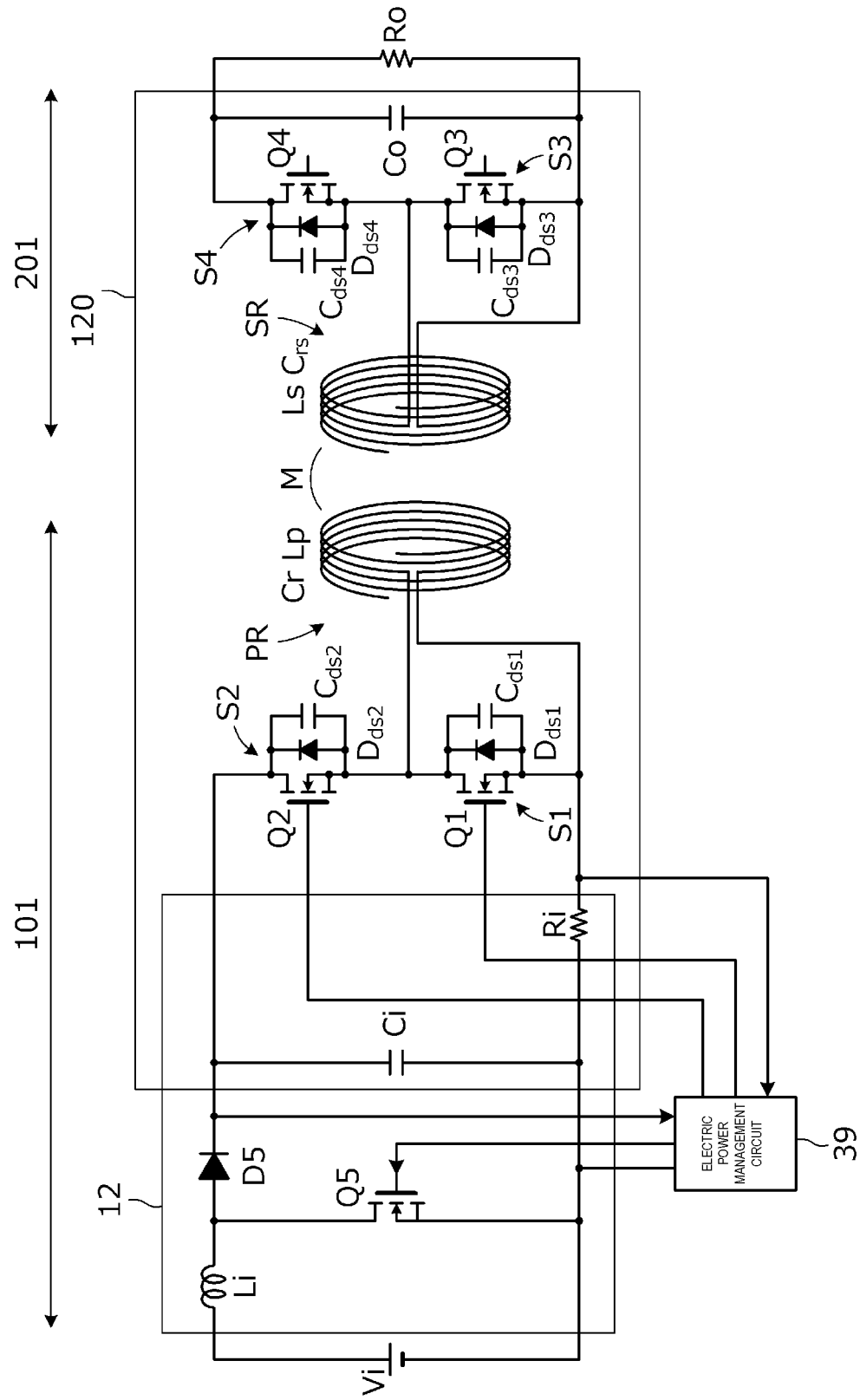
FIG. 4 is a circuit diagram illustrating a configuration of a wireless power supply system according to a third embodiment.

FIG. 4 is a circuit diagram illustrating a configuration of a wireless power supply system 303 according to the third embodiment. This example is different from the example described in the second embodiment especially in configurations of a power transmission resonance mechanism and a power reception resonance mechanism.

The wireless power transmission apparatus 101 includes the first switch circuit S1, the second switch circuit S2, and the power transmission resonance capacitor Cr. The wireless power transmission apparatus 101 also includes the voltage conversion circuit 12 including the switching element Q5, the diode D5, the inductor Li, and the intermediate capacitor Ci. The wireless power transmission apparatus 101 further includes the resistor element Ri and the electric power management circuit 39. The electric power management circuit 39 controls the switching elements Q1, Q2, and Q5. The voltage conversion circuit 12 operates as a step-up converter.

The wireless power transmission coil Lp is not a coil whose both ends are supplied with electric power but is a helical coil (antenna) whose center is supplied with electric power. The wireless power transmission coil Lp includes the power transmission resonance capacitor Cr as a parasitic capacitance component. The wireless power transmission coil Lp and the power transmission resonance capacitor Cr configure the power transmission resonance mechanism PR.

The wireless power reception apparatus 201 includes the power reception resonance mechanism SR that includes the wireless power reception coil Ls and the power reception resonance capacitor Crs, and a rectifying and smoothing circuit. The rectifying and smoothing circuit includes the third switch circuit S3, the fourth switch circuit S4, and the smoothing capacitor Co.

The wireless power reception coil Ls is a helical coil (antenna) whose center is supplied with electric power. The wireless power reception coil Ls includes the power reception resonance capacitor Crs as a parasitic capacitance component. The wireless power reception coil Ls and the power reception resonance capacitor Crs configure the power reception resonance mechanism SR.

The other configurations are the same as those described above in the second embodiment. The electric power management circuit 39 inside the wireless power transmission apparatus 101 detects, based on the step-down voltage of the resistor element Ri, a current (intermediate input current) input to the power transmission circuit from the voltage conversion circuit, that is, a current supplied to the wireless power supply unit 120 from the voltage conversion circuit 12. The electric power management circuit 39 sets an upper limit value for the intermediate input current, so that the output voltage of the voltage conversion circuit 12 (voltage of the intermediate capacitor Ci) is controlled in such a manner that the intermediate input current does not exceed the upper limit value.

Fourth Embodiment

In a fourth embodiment, a wireless power supply system that specifically represents a voltage conversion circuit, an intermediate input current detection circuit, a rectifying and smoothing circuit, and so on will be described as an example.

Figure 5:
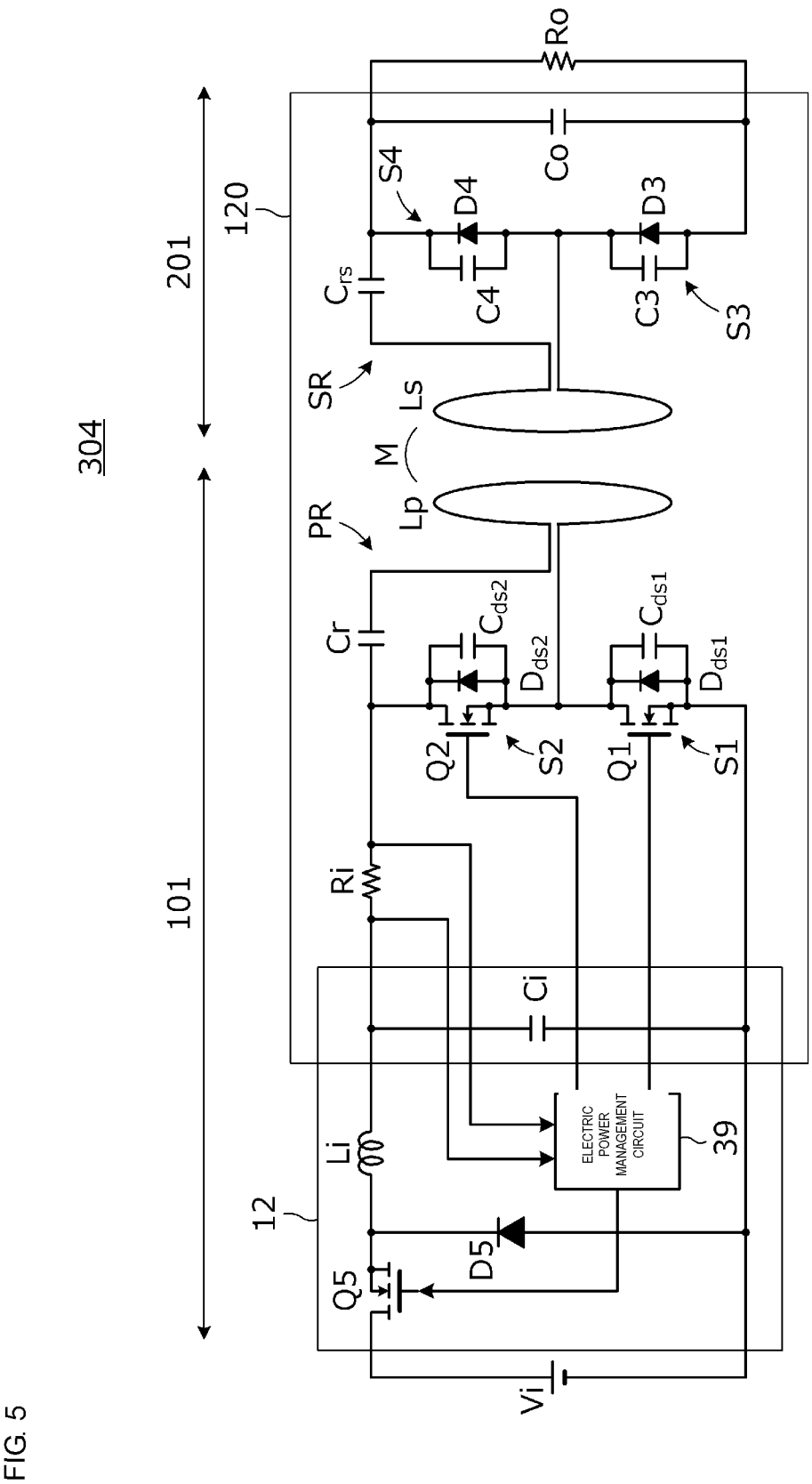
FIG. 5 is a circuit diagram illustrating a configuration of a wireless power supply system according to a fourth embodiment.

FIG. 5 is a circuit diagram illustrating a configuration of a wireless power supply system 304 according to the fourth embodiment. This example is different from the example described in the second embodiment especially in configurations of a rectifying and smoothing circuit, a power transmission resonance mechanism, and a power reception resonance mechanism. The wireless power transmission coil Lp and the wireless power reception coil Ls each have a loop shape.

In the wireless power supply system 304, the wireless power transmission apparatus 101 is a circuit that performs a class-D converter operation, and the wireless power reception apparatus 201 is a circuit that performs a series resonance operation and a voltage-doubler rectifying operation. The configuration on the power transmission side is the same as that in the example illustrated in FIG. 3. The power reception resonance capacitor Crs connected to the wireless power reception coil Ls is provided on the power reception side. The wireless power reception coil Ls and the power reception resonance capacitor Crs configure a series resonance circuit. The rectifying and smoothing circuit includes the third switch circuit S3 including a diode D3 and a capacitor C3 and the fourth switch circuit S4 including a diode D4 and a capacitor C4. The other configurations are the same as those described above in the second embodiment.

The electric power management circuit 39 inside the wireless power transmission apparatus 101 detects, based on the step-down voltage of the resistor element Ri, a current (intermediate input current) input to the power transmission circuit from the voltage conversion circuit 12, that is, a current supplied to the wireless power supply unit 120 from the voltage conversion circuit 12. The electric power management circuit 39 sets an upper limit value for the intermediate input current, so that the output voltage of the voltage conversion circuit 12 (voltage of the intermediate capacitor Ci) is controlled in such a manner that the intermediate input current does not exceed the upper limit value.

Fifth Embodiment

In a fifth embodiment, a wireless power supply system that specifically represents a voltage conversion circuit, an intermediate input current detection circuit, a rectifying and smoothing circuit, and so on will be described as an example.

Figure 6:
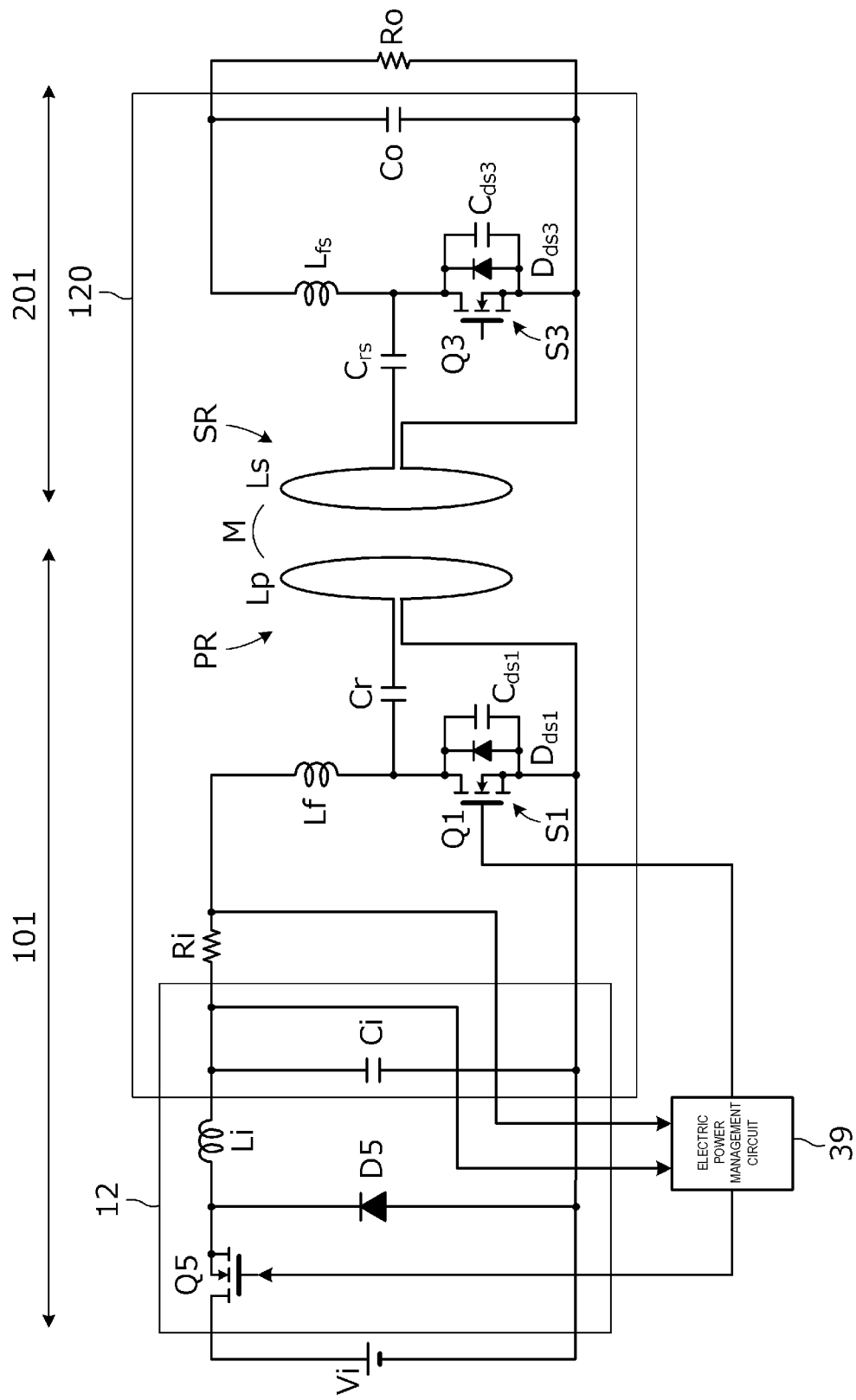
FIG. 6 is a circuit diagram illustrating a configuration of a wireless power supply system according to a fifth embodiment.

FIG. 6 is a circuit diagram illustrating a configuration of a wireless power supply system 305 according to the fifth embodiment. This example is different from the example described in the second embodiment especially in the configuration of a switching circuit.

In the wireless power supply system 305, the wireless power transmission apparatus 101 performs a class-E converter operation, and the wireless power reception apparatus 201 performs a series resonance operation and a class-E rectifying operation.

The wireless power transmission apparatus 101 includes the first switch circuit S1 that equivalently includes a parallel connection circuit including the switching element Q1, the diode Dds1, and the capacitor Cds1, an inductor Lf, and the resonance capacitor Cr. The wireless power transmission coil Lp and the resonance capacitor Cr configure the power transmission resonance mechanism PR.

By switching of the first switching element Q1 at a predetermined operating frequency, the electric power management circuit 39 intermittently provides a DC voltage to a resonance circuit that includes the inductor Lf, the resonance capacitor Cr, and the wireless power transmission coil Lp, so that a resonance current is generated at the wireless power transmission coil Lp.

The wireless power reception apparatus 201 includes the power reception resonance mechanism SR that includes the wireless power reception coil Ls and the power reception resonance capacitor Crs, and a rectifying and smoothing circuit. The rectifying and smoothing circuit includes the third switch circuit S3 that equivalently includes a parallel connection circuit including the third switching element Q3, the diode Dds3, and the capacitor Cds3, an inductor Lfs, and the smoothing capacitor Co.

The third switch circuit S3 rectifies a voltage generated at a power reception resonance circuit that includes the wireless power reception coil Ls, the power reception resonance capacitor Crs, and the inductor Lfs, and the smoothing capacitor Co smooths the voltage. The other configurations are the same as those described above in the second embodiment.

The electric power management circuit 39 inside the wireless power transmission apparatus 101 detects, based on the step-down voltage of the resistor element Ri, a current (intermediate input current) input to the power transmission circuit from the voltage conversion circuit 12, that is, a current supplied to the wireless power supply unit 120 from the voltage conversion circuit 12. The electric power management circuit 39 sets an upper limit value for the intermediate input current, so that the output voltage of the voltage conversion circuit 12 (voltage of the intermediate capacitor Ci) is controlled in such a manner that the intermediate input current does not exceed the upper limit value.

Sixth Embodiment

In a sixth embodiment, a wireless power supply system that specifically represents a voltage conversion circuit, an intermediate input current detection circuit, a rectifying and smoothing circuit, and so on will be described as an example.

Figure 7:
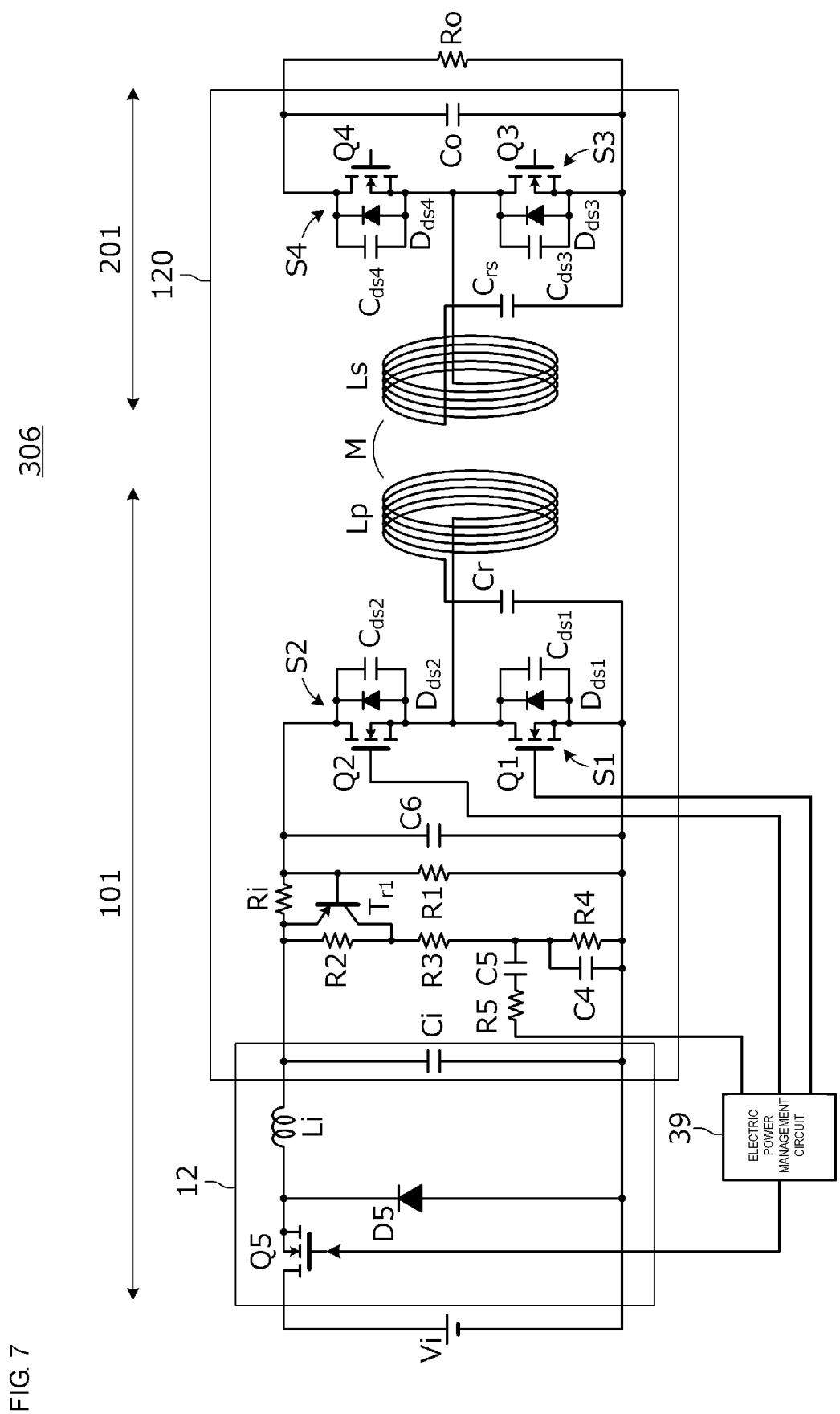
FIG. 7 is a circuit diagram illustrating a configuration of a wireless power supply system according to a sixth embodiment.

FIG. 7 is a circuit diagram illustrating a configuration of a wireless power supply system 306 according to the sixth embodiment. This example is different from the example described in the second embodiment in the configuration of an intermediate input current detection circuit.

In the wireless power supply system 306, a transistor Tr1, resistor elements Ri, R1, R2, R3, R4, and R5, and capacitors C4 and C5 configure an intermediate input current detection circuit. In the intermediate input current detection circuit, the division ratio of a voltage-dividing circuit including the resistor elements R2, R3, and R4 and the transistor Tr1 varies according to the step-down voltage of the resistor element Ri, and the divided voltage is fed back to the electric power management circuit 39. In this example, the detection resolution of the intermediate input current detection circuit increases in accordance with a gain by the transistor Tr1.

The resistor elements R4 and R5 and the capacitors C4 and C5 configure a filter of a feedback circuit. The pass band of the filter adjusts a frequency band in the feedback circuit for controlling switching operations of the switching elements Q1 and Q2. With the use of the filter, the output voltage of the voltage conversion circuit 12 (voltage of the intermediate capacitor Ci) can be controlled stably over a wide frequency band.

With the provision of the capacitor C6, the step-down voltage of the resistor element Ri can be compensated for, and the influence of a pulse current caused by switching operations of the switching elements Q1 and Q2 can be prevented from being exerted on the intermediate input current flowing in the resistor element Ri. That is, the capacitor C6 is capable of causing the intermediate input current flowing in the resistor element Ri to have a waveform close to the waveform of a DC current, not the waveform of a switching current.

The electric power management circuit 39 inside the wireless power transmission apparatus 101 detects, based on the step-down voltage of the resistor element Ri, a current (intermediate input current) input to the power transmission circuit from the voltage conversion circuit 12, that is, a current supplied to the wireless power supply unit 120 from the voltage conversion circuit 12. The electric power management circuit 39 sets an upper limit value for the intermediate input current, so that the output voltage of the voltage conversion circuit 12 (voltage of the intermediate capacitor Ci) is controlled in such a manner that the intermediate input current does not exceed the upper limit value.

Seventh Embodiment

In a seventh embodiment, a voltage conversion circuit with a configuration different from those of the voltage conversion circuits 12 described above will be described as an example. In this embodiment, a voltage conversion circuit that converts the voltage of an input power supply is configured as a DC-DC converter including a negative feedback control circuit that detects an output voltage and performs negative feedback control of the output voltage. The DC-DC converter is an isolated converter.

Figure 8:
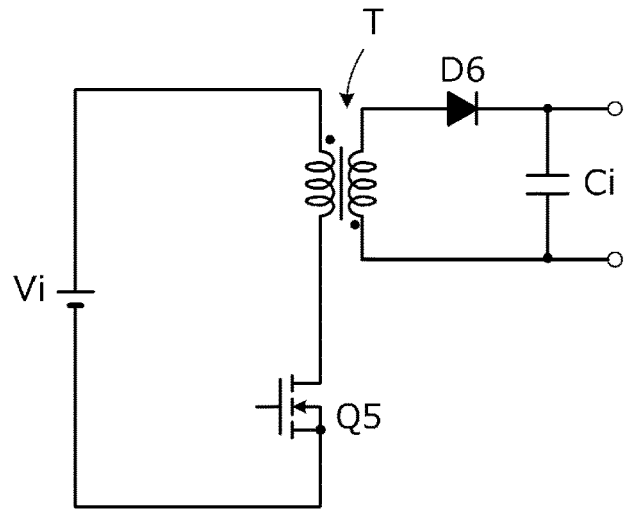
FIG. 8 is a circuit diagram of a voltage conversion circuit provided in a wireless power transmission apparatus according to the seventh embodiment.

FIG. 8 is a circuit diagram of the voltage conversion circuit provided in a wireless power transmission apparatus according to the seventh embodiment. In FIG. 8, the switching element Q5 is connected between the input power supply Vi and a primary coil of a transformer T. A diode D6 and the intermediate capacitor Ci are connected to a secondary coil of the transformer T. The coupling polarity of the primary coil and the secondary coil of the transformer T is as illustrated in the drawing. A flyback converter is configured, as illustrated in FIG. 8.

Figure 9:
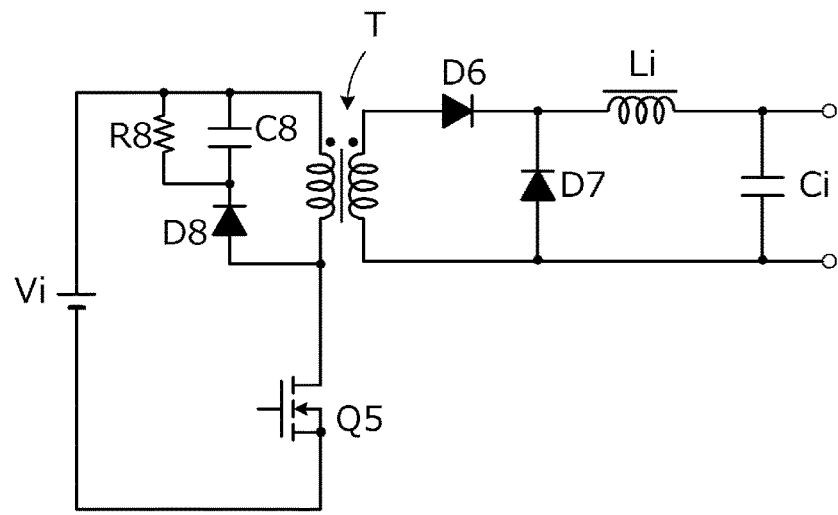
FIG. 9 is another circuit diagram of the voltage conversion circuit provided in the wireless power transmission apparatus according to the seventh embodiment.

FIG. 9 is another circuit diagram of the voltage conversion circuit provided in the wireless power transmission apparatus according to the seventh embodiment. In FIG. 9, the switching element Q5 is connected between the input power supply Vi and the primary coil of the transformer T. Furthermore, a parallel circuit including a capacitor C8 and a resistor element R8 and a series circuit including the capacitor C8 and the diode D8 are connected to the primary coil of the transformer T. Diodes D6 and D7, the inductor Li, and the intermediate capacitor Ci are connected to the secondary coil of the transformer T. The coupling polarity of the primary coil and the secondary coil of the transformer T is as illustrated in the drawing. A forward converter is configured, as illustrated in FIG. 9.

As described in this embodiment, with the use of an isolated DC-DC converter, electrical insulation between input and output can be obtained. Thus, effects such as prevention of electrical shock of a user and reduction of electromagnetic conduction noise can be achieved. In particular, a flyback converter needs only a small number of components and is thus suitable for size reduction.

Eighth Embodiment

In an eighth embodiment, a voltage conversion circuit with a configuration different from those of the voltage conversion circuits 12 described above will be described as an example. In this embodiment, a voltage conversion circuit that converts the voltage of an input power supply is configured as a series regulator including a negative feedback control circuit that detects an output voltage and performs negative feedback control of the output voltage.

Figure 10:
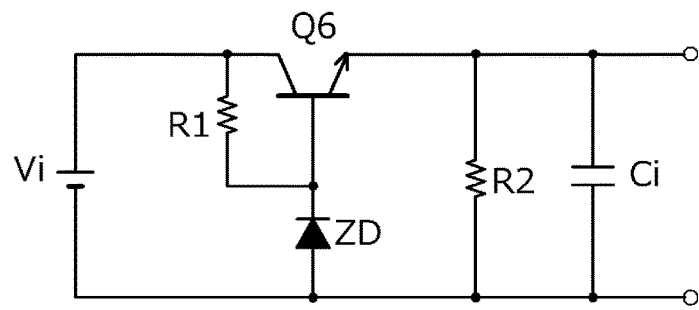
FIG. 10 is a circuit diagram of a voltage conversion circuit provided in a wireless power transmission apparatus according to an eighth embodiment.

FIG. 10 is a circuit diagram of the voltage conversion circuit provided in a wireless power transmission apparatus according to the eighth embodiment. In FIG. 10, the transistor Q6 is connected in series between the input power supply Vi and an output part. A series circuit including the resistor element R1 and a Zener diode ZD is provided between the collector of the transistor Q6 and a reference potential. The resistor element R2 is connected between the emitter of the transistor Q6 and the reference potential. The Zener diode ZD is connected to the base of the transistor Q6 in such a manner that the voltage of the Zener diode ZD is applied to the base of the transistor Q6. The intermediate capacitor Ci is connected to the output part of the voltage conversion circuit.

Figure 11:
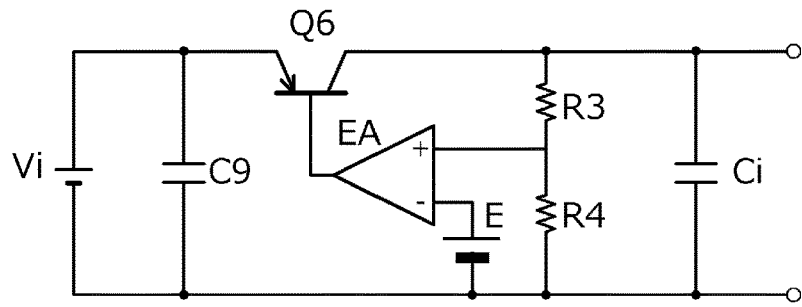
FIG. 11 is another circuit diagram of the voltage conversion circuit provided in the wireless power transmission apparatus according to the eighth embodiment.

FIG. 11 is another circuit diagram of the voltage conversion circuit provided in the wireless power transmission apparatus according to the eighth embodiment. In FIG. 11, the transistor Q6 is connected in series between the input power supply Vi and the output part. A voltage-dividing circuit including the resistor elements R3 and R4 and a negative feedback circuit including a reference voltage circuit E and an error amplifier EA are arranged between the collector of the transistor Q6 and the reference potential. An output part of the error amplifier EA draws a base current of the transistor Q6. A capacitor C9 is connected to an input part of the voltage conversion circuit, and the intermediate capacitor Ci is connected to the output part.

As described above, with the use of a series regulator, voltage adjustment can be achieved with a small circuit scale. Furthermore, because a small number of components are required compared to the case of DC-DC converters, size reduction of a circuit can be achieved.

Ninth Embodiment

In a ninth embodiment, an input power supply with a configuration different from those of the input power supplies described above will be described as an example. In this embodiment, an input power supply to the voltage conversion circuit 12 is a DC voltage source.

Figure 12:
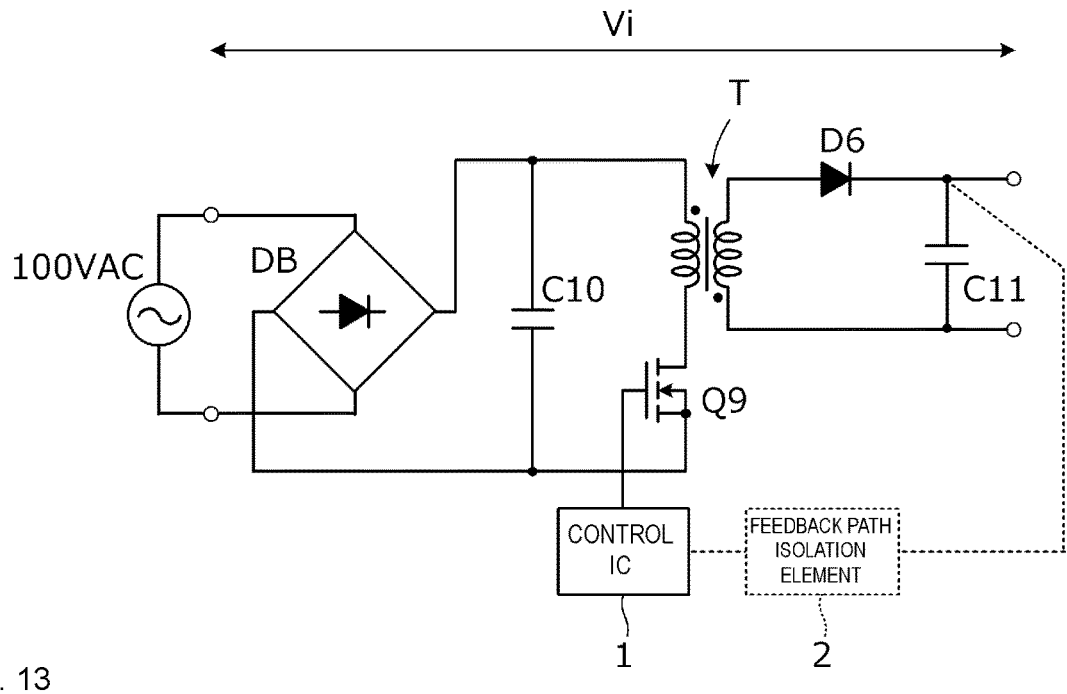
FIG. 12 is a circuit diagram of an input power supply according to a ninth embodiment.

FIG. 12 is a circuit diagram of the input power supply Vi according to the ninth embodiment. The input power supply Vi includes a diode bridge circuit DB that rectifies a commercial AC power supply, a capacitor C10, the transformer T, the switching element Q9, the diode D6, and a capacitor C11.

The switching element Q9 is connected between output of a rectifying and smoothing circuit including the diode bridge circuit DB and the capacitor C10 and the primary coil of the transformer T. A feedback path insulation element 2 is in an insulated state, and the output voltage of the voltage conversion circuit 12 is detected. A control IC 1 performs switching control of the switching element Q9 in such a manner that the output voltage of the input power supply Vi is equal to a predetermined voltage.

Tenth Embodiment

In a tenth embodiment, an input power supply with a configuration different from those of the input power supplies described above will be described as an example. In this embodiment, an input power supply to the voltage conversion circuit 12 is a DC current source.

Figure 13:
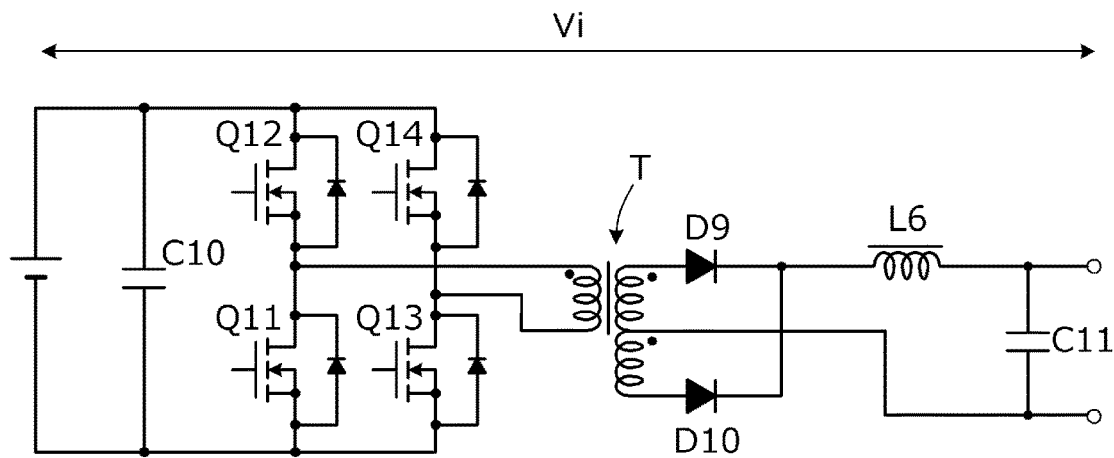
FIG. 13 is a circuit diagram of an input power supply according to a tenth embodiment.

FIG. 13 is a circuit diagram of the input power supply Vi according to the tenth embodiment. The input power supply Vi includes a capacitor C10, switching elements Q11, Q12, Q13, and Q14, the transformer T, diodes D9 and D10, an inductor L6, and a capacitor C11.

The above-mentioned switching elements Q11, Q12, Q13, and Q14, the transformer T, the diodes D9 and D10, the inductor L6, and the capacitor C11 configure a full-bridge DC-DC converter. A switching control circuit is connected to the switching elements Q11, Q12, Q13, and Q14, so that the switching control circuit controls the output current of the DC-DC converter to a constant value. With this configuration, the DC-DC converter operates as a DC current source.

Finally, the present disclosure is not limited to the embodiments described above. Modifications and changes can be made by those skilled in the art in an appropriate manner. The scope of the present disclosure is not illustrated by the embodiments described above but by the claims. Furthermore, the scope of the present disclosure covers modifications and changes made to embodiments that fall within the scope of the claims and their equivalents.

For example, a step-down converter, a step-up converter, and other various converters such as a step-up/step-down converter and an isolated converter that detect an output voltage, feed back a voltage signal, compare a feedback potential with a reference value, adjust the width of pulses for driving a switching element, and control the output voltage to a predetermined constant value, may be used for a voltage conversion circuit.

Furthermore, to detect the intermediate current, instead of a transistor illustrated in FIG. 7, a comparator or an operational amplifier may be used.

Furthermore, an electric power management circuit is not limited to an analog circuit or a digital circuit. The electric power management circuit may be configured to include both an analog circuit and a digital circuit.

What is claimed is:

1. A wireless power transmission apparatus comprising:
   a power transmission resonance mechanism that includes a power transmission coil and a power transmission resonance capacitor;
   a power transmission circuit configured to perform switching in such a manner that a DC voltage or a DC current is intermittently provided to the power transmission resonance mechanism at a predetermined switching frequency;
   a voltage conversion circuit configured to perform voltage conversion on an input power supply;
   an intermediate capacitor that is between the voltage conversion circuit and the power transmission circuit and shared between the voltage conversion circuit and the power transmission circuit;
   an intermediate input current detection circuit configured to detect an intermediate input current input to the power transmission circuit from the voltage conversion circuit; and
   an electric power management circuit that, by setting an upper limit value for the intermediate input current and controlling an intermediate voltage, which is a voltage of the intermediate capacitor serving as an output voltage of the voltage conversion circuit, is configured to adjust an amplitude of the DC voltage or the DC current intermittently provided to the power transmission resonance mechanism,
   wherein the electric power management circuit is configured to control strength of an alternating magnetic field at the switching frequency generated by the power transmission coil.

2. The wireless power transmission apparatus according to claim 1, wherein
   when the intermediate input current reaches the upper limit value, the electric power management circuit is configured to control the voltage conversion circuit in such a manner that the intermediate voltage serving as the output voltage of the voltage conversion circuit decreases.

3. The wireless power transmission apparatus according to claim 2, wherein
   the electric power management circuit includes a temperature detection circuit that is configured to detect temperature of the voltage conversion circuit or the power transmission circuit and control the voltage conversion circuit to reduce the intermediate voltage serving as the output voltage of the voltage conversion circuit in such a manner that the temperature detected by the temperature detection circuit does not exceed a predetermined upper limit value.

4. The wireless power transmission apparatus according to claim 2, wherein
   by detecting a voltage of the power transmission resonance capacitor and controlling the voltage conversion circuit in such a manner that the voltage of the power transmission resonance capacitor does not exceed a predetermined upper limit value, the electric power management circuit is configured to reduce the intermediate voltage.

5. The wireless power transmission apparatus according to claim 2, wherein
   the electric power management circuit includes an abnormality detection circuit that is configured to detect an abnormality of the voltage conversion circuit or the power transmission circuit, and
   when the abnormality detection circuit detects that there is an abnormality in the voltage conversion circuit or the power transmission circuit, the electric power management circuit is configured to reduce the intermediate voltage serving as the output voltage of the voltage conversion circuit to a value less than or equal to a predetermined value and stops switching of the power transmission circuit.

6. The wireless power transmission apparatus according to claim 2, wherein
   the voltage conversion circuit is a DC-DC converter including a negative feedback control circuit configured to detect an output voltage and performs negative feedback control of the output voltage.

7. The wireless power transmission apparatus according to claim 1, wherein
   the electric power management circuit includes a temperature detection circuit that is configured to detect temperature of the voltage conversion circuit or the power transmission circuit and control the voltage conversion circuit to reduce the intermediate voltage serving as the output voltage of the voltage conversion circuit in such a manner that the temperature detected by the temperature detection circuit does not exceed a predetermined upper limit value.

8. The wireless power transmission apparatus according to claim 1, wherein
   by detecting a voltage of the power transmission resonance capacitor and controlling the voltage conversion circuit in such a manner that the voltage of the power transmission resonance capacitor does not exceed a predetermined upper limit value, the electric power management circuit is configured to reduce the intermediate voltage.

9. The wireless power transmission apparatus according to claim 1, wherein
   the electric power management circuit includes an abnormality detection circuit that is configured to detect an abnormality of the voltage conversion circuit or the power transmission circuit, and
   when the abnormality detection circuit detects that there is an abnormality in the voltage conversion circuit or the power transmission circuit, the electric power management circuit is configured to reduce the intermediate voltage serving as the output voltage of the voltage conversion circuit to a value less than or equal to a predetermined value and stops switching of the power transmission circuit.

10. The wireless power transmission apparatus according to claim 1, wherein
the voltage conversion circuit is a DC-DC converter including a negative feedback control circuit configured to detect an output voltage and performs negative feedback control of the output voltage.

11. The wireless power transmission apparatus according to claim 1, wherein
the DC-DC converter is an isolated converter.

12. The wireless power transmission apparatus according to claim 1, wherein
the input power supply is a DC current source.

13. The wireless power transmission apparatus according to claim 1, wherein
the input power supply includes a circuit configured to rectify and smooth a commercial AC power supply.

14. The wireless power transmission apparatus according to claim 1, wherein
the voltage conversion circuit is a series regulator including a negative feedback control circuit configured to detect an output voltage and performs negative feedback control of the output voltage.

15. The wireless power transmission apparatus according to claim 1, wherein
the input power supply is a DC voltage source.

16. A wireless power supply system comprising:
a wireless power reception apparatus; and
a wireless power transmission apparatus,
wherein
the wireless power reception apparatus includes a power reception coil,
the wireless power transmission apparatus includes
a power transmission resonance mechanism that includes a power transmission coil configured to magnetically couple to the power reception coil, and a power transmission resonance capacitor,
a power transmission circuit configured to perform switching in such a manner that a DC voltage or a DC current is intermittently provided to the power transmission resonance mechanism at a predetermined switching frequency,
a voltage conversion circuit configured to perform voltage conversion on an input power supply,
an intermediate capacitor that is between the voltage conversion circuit and the power transmission circuit and shared between the voltage conversion circuit and the power transmission circuit,
an intermediate input current detection circuit configured to detect an intermediate input current input to the power transmission circuit from the voltage conversion circuit, and
an electric power management circuit that, by setting an upper limit value for the intermediate input current and controlling an intermediate voltage, which is a voltage of the intermediate capacitor serving as an output voltage of the voltage conversion circuit, is configured to adjust an amplitude of the DC voltage or the DC current intermittently provided to the power transmission resonance mechanism, and
the electric power management circuit is configured to control strength of an alternating magnetic field at the switching frequency generated by the power transmission coil.

17. The wireless power supply system according to claim 16, wherein
the wireless power reception apparatus includes a modulator configured to transfer a received power request signal to the wireless power transmission apparatus under resonance modulation control,
the wireless power transmission apparatus includes a demodulator configured to demodulate the received power request signal, and
the electric power management circuit is configured to control the voltage conversion circuit in such a manner that the intermediate voltage serving as the output voltage of the voltage conversion circuit is adjusted in accordance with the received power request signal.

18. The wireless power transmission apparatus according to claim 16, wherein
the input power supply is a DC voltage source.

19. The wireless power transmission apparatus according to claim 16, wherein
the input power supply is a DC current source.

20. The wireless power transmission apparatus according to claim 16, wherein
the input power supply includes a circuit configured to rectify and smooth a commercial AC power supply.

* * * * *